April 1, 1958 W. G. SHEPARD 2,829,253

ELECTRONIC FREQUENCY DOUBLERS

Filed June 21, 1954

INVENTOR.
WILLIAM G. SHEPARD
BY
Reynolds, Beach & Christensen
ATTORNEYS

United States Patent Office 2,829,253

Patented Apr. 1, 1958

2,829,253

ELECTRONIC FREQUENCY DOUBLERS

William G. Shepard, Seattle, Wash., assignor to Boeing Airplane Company, a corporation of Delaware Application June 21, 1954, Serial No. 438,141

3 Claims. (Cl. 250—36)

Figure 1:
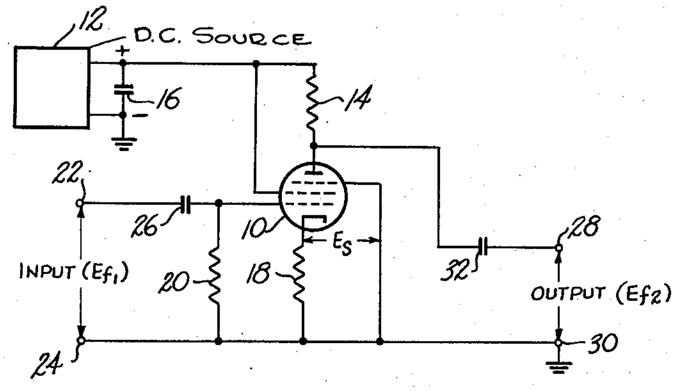

This invention relates to electronic circuit apparatus for producing from a first alternating voltage a second alternating voltage having a substantial alternating voltage component of a frequency twice the frequency of the first-mentioned alternating voltage, and more particularly for converting an alternating voltage of sinusoidal form into a second alternating voltage also of substantially sinusoidal form, but twice the frequency of the first voltage. The invention is herein illustratively described by reference to its presently preferred form; however, it will be understood that certain changes and modifications in respect to details may be made without departing from the inventive features involved.

It is often necessary in various types of electrical and electronic circuit apparatus to provide an alternating voltage of a frequency which is twice that of an existing alternating voltage, and in some instances to redouble the frequency one or more times. Frequency doublers of various types capable of performing the desired function have been proposed and used in the past, but in general these were relatively complex or critical of adjustment and sometimes unreliable in operation. Moreover, a number of the previously considered types were capable of operating only at a single assigned base frequency, whereas others which were capable of responding to different frequencies were quite restricted in respect to their useful frequency range.

An object of the present invention is an electronic frequency doubler circuit of relatively simple form.

A related object is the frequency doubler circuit using standard, commercially available circuit components and capable of satisfactory operation over a very broad band of frequencies extending from virtually zero to frequencies in the range of one hundred kilocycles per second or higher without any redesign or readjustment of the circuit or components thereof. Thus the present circuit provides substantially the same frequency doubling action although the input signal may vary from zero to a very high frequency. In this same regard no tuned circuits are required in the operation of the present circuit which would tend to confine the operating frequency to a particular value or values.

Still another object of the present invention is a frequency doubler circuit which is capable of converting an alternating voltage of sinusoidal form into a second alternating voltage of substantially sinusoidal form without use of tuned circuits or filters for eliminating harmonic components from the doubled frequency.

Another object of the present invention is a frequency multiplier or doubler circuit utilizing a single amplifier tube having a single set of amplifier electrodes including anode, cathode and at least three grids to accomplish the above described results.

In accordance with this invention special application is made of a characteristic found in certain types of electron discharge devices, representative and preferred of which is the 6AS6 pentode vacuum tube. In the 6AS6 tube, for example, total current flow is fairly constant for a given voltage applied between cathode and control grid, whereas the division of this current between anode and screen grid may be varied by varying the voltage applied between cathode and suppressor grid. Thus by causing the suppressor grid to become increasingly negative relative to the cathode an increasing proportion of the total electron flow through the tube is drawn by the screen and less by the plate, whereas a decrease in this negative potential produces a reverse change in the current division ratio between plate and screen. It is found on the basis of these relationships that the application of a sine wave voltage between cathode and control grid and of a second sine wave voltage of relatively opposite phasing between cathode and suppressor grid produce output voltage variations across an anode (or screen) load impedance which contain a substantial or predominant component at double the original sine wave frequency. In fact the circuit may be designed so that with certain input signal amplitudes the output wave closely approximates a true sine wave of double the original wave frequency.

In carrying out the objects of the invention the cathode of the tube is connected to the negative side of the plate voltage source through a resistance, but unlike the usual amplifier cathode self-bias arrangement no by-pass condenser is connected across the cathode resistor in the present case. The suppressor is connected to a point of constant reference potential, usually the negative terminal of said voltage source. Thus when alternating voltage at the original wave frequency is applied between cathode and control grid the resulting variations in the voltage drop occurring in the cathode bias resistor inherently provide the counter-phased alternating voltage between cathode and suppressor grid to provide the frequency doubling action herein disclosed.

These and other features, objects and advantages of the invention including certain details of illustrative forms thereof will become more fully evident from the following description by reference to the accompanying drawings.

Figure 1 is a schematic diagram of a circuit representing the preferred embodiment of the invention.

Figure 2:
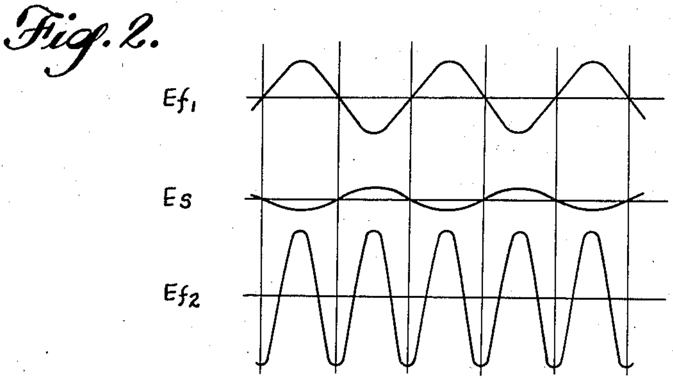

Figure 2 graphically illustrates approximate wave forms characterizing the circuit operation.

Referring to Figure 1, the electron discharge device 10 comprises a pentode vacuum tube such as the 6AS6 type wherein control grid voltage primarily determines total cathode current and suppressor grid voltage primarily determines the ratio of currents drawn by the plate and screen grids respectively. Plate voltage for operation of the circuit is provided by the direct voltage source 12. The negative side of this source is grounded as shown and its positive side is connected to the anode of tube 10 through a plate load resistance 14. A filter condenser 16 connected across the source terminals insures substantially constant source voltage. The screen of tube 10 is connected directly to the positive side of source 12, whereas the suppressor is grounded. The cathode is connected to ground through a biasing resistance 18 having no by-pass condenser. A grid leak resistance 20 is provided.

Alternating voltage $Ef_1$ at the original wave frequency is applied to the circuit through input terminals 22 and 24. Terminal 24 is grounded and terminal 22 is connected to the control grid of tube 10 through a D.-C. blocking condenser 26. Alternating voltage $Ef_2$ at twice the original wave frequency is then provided between the two output terminals 28 and 30. Terminal 30 is grounded while terminal 28 is connected to the tube's anode through D.-C. blocking condenser 32.

When the tube 10 is a 6AS6 pentode and the voltage $Ef_1$ is a true sine wave it is found that observance of the following design data and operating conditions produces a double frequency output wave which very closely approximates a true sine wave:

| | | |
|---|---|---|
| Plate voltage source 12 | volts | 120 |
| Screen voltage | do | 120 |
| Resistance 14 | ohms | 56,000 |
| Resistance 18 | do | 1,000 |
| Resistance 20 | do | 470,000 |
| $Ef_1$ | volts | 1.2 |

Under these conditions the double-frequency output voltage $Ef_2$ is approximately 2.4 volts. This circuit has virtually no lower frequency limit, and operates successfully at any frequency up to about 100,000 cycles, whereas at much higher frequencies than this tuned circuits become necessary due to various interelectrode capacitances and related effects. Within its very wide useful operating frequency range, however, the action of the circuit is substantially uniform.

Figure 2 illustrates the operation of the circuit. The input alternating voltage $Ef_1$ is represented as a sine wave. Ignoring D.-C. components, the voltage developed across cathode resistance 18 by flow of current through tube 10 is also a sine wave of the same frequency and relative phasing as the input wave but of somewhat smaller amplitude. However, since the suppressor of the tube is grounded the alternating voltage $E_s$ effectively applied between this grid and the cathode by reason of voltage drop occurring in resistance is 180 degrees out of phase with the input voltage $Ef_1$, as depicted the middle graph in Figure 2, which graph uses the same potiential reference, i. e. that of the tube's cathode, as the first graph. The third graph $Ef_2$ has a different reference. Hence as the total flow of space discharge current through the tube is following a sine wave positive peak the percentage of this total current being drawn by the plate is reduced to a minimum by reason of the accompanying maximum negative voltage being applied to the suppressor which allows the screen to draw abnormal current. On the alternate half cycles, the total current flowing through the tube is reduced to a minimum by the negative value of $Ef_1$ so that even though the suppressor is then at maximum positive potential relative to the cathode the actual amount of current drawn by the anode is again at a minimum. As a result of this dual control of the first and third grids energized out of phase the anode current undergoes two peaks and nulls for each cycle of the applied alternating voltage $Ef_1$. If the incoming sine waves are of proper amplitude the fundamental is almost entirely eliminated, leaving a double-frequency sine wave $Ef_2$ at the output terminals without necessity of filtering.

I claim as my invention:

1. Electronic circuit apparatus for producing from a first alternating voltage a second alternating voltage of twice the frequency of the first alternating voltage, such apparatus comprising an electron discharge device having a first electrode, an electron emission electrode operable to emit electrons for sustaining current flow through said device approximately proportional to the potential difference between said first electrode and said emission electrode, and third, fourth and fifth electrodes, said third and fifth electrodes being effective to draw electrons from said emission electrode, and said fourth electrode being effective to increase the electron current drawn by said third electrode while correspondingly decreasing that drawn by said fifth electrode in response to increasing negative potential applied to said fourth electrode relative to said emission electrode, and conversely to decrease the current drawn by said third electrode while corespondingly increasing the current drawn by said fifth electrode in response to increasing positive potential applied to said fourth electrode relative to said emission electrode, means including a load impedance forming an energized load circuit including said fifth electrode and emission electrode, said load circuit including output connections providing output voltage from the apparatus proportional to voltage drop in said load impedance produced by current drawn through said fifth electrode, and input circuit means including conductor means at substantially constant reference potential, an input conductor connected to the first electrode for application of input alternating voltage between said first electrode and said reference potential conductor means, conductive means connecting the fourth electrode to said reference potential conductor means, and impedance means interconnecting said reference potential conductor means and said emission electrode and having material impedance value at the input alternating voltage frequency, said reference potential conductor means being connected in circuit with the energized load circuit, whereby alternating current flow through the emission electrode, hence through said latter impedance means produces alternating voltage applied between the emission electrode and the fourth electrode opposite in phase relative to that applied between said emission electrode and first electrode, thereby producing a double frequency alternating voltage across said load impedance.

2. Electronic circuit apparatus for producing from a first alternating voltage a second alternating voltage having twice the frequency, comprising an electron discharge device having anode, cathode, control grid, screen grid and suppressor grid, an anode-cathode circuit including a source of substantially constant direct voltage and an anode load impedance interposed between said anode and the positive terminal of said source, a resistance connected between said cathode and the negative terminal of said source, a conductive connection between said suppressor grid and said negative terminal maintaining said suppressor grid at substantially constant potential relative to said negative terminal, whereas the cathode potential may vary relative to said negative terminal in accordance with voltage drop in said resistance due to anode-cathode current, means applying substantially constant potential to said screen grid relative to said negative terminal, and means connected to said control grid and said negative terminal for applying input alternating voltage therebetween at the frequency to be doubled, whereby the resulting phase opposition of the alternating voltage between said control grid and cathode and between said suppressor grid and cathode produces a double-frequency alternating voltage across said load impedance.

3. The apparatus defined in claim 2, wherein the discharge device comprises a vacuum tube of the 6AS6 type.

References Cited in the file of this patent

UNITED STATES PATENTS

| | | |
|---|---|---|
| 2,253,575 | Norton | Aug. 26, 1941 |
| 2,262,380 | Bach | Nov. 11, 1941 |
| 2,474,769 | Young | June 28, 1949 |
| 2,503,968 | Root | Apr. 11, 1950 |